UNITED STATES PATENT OFFICE.

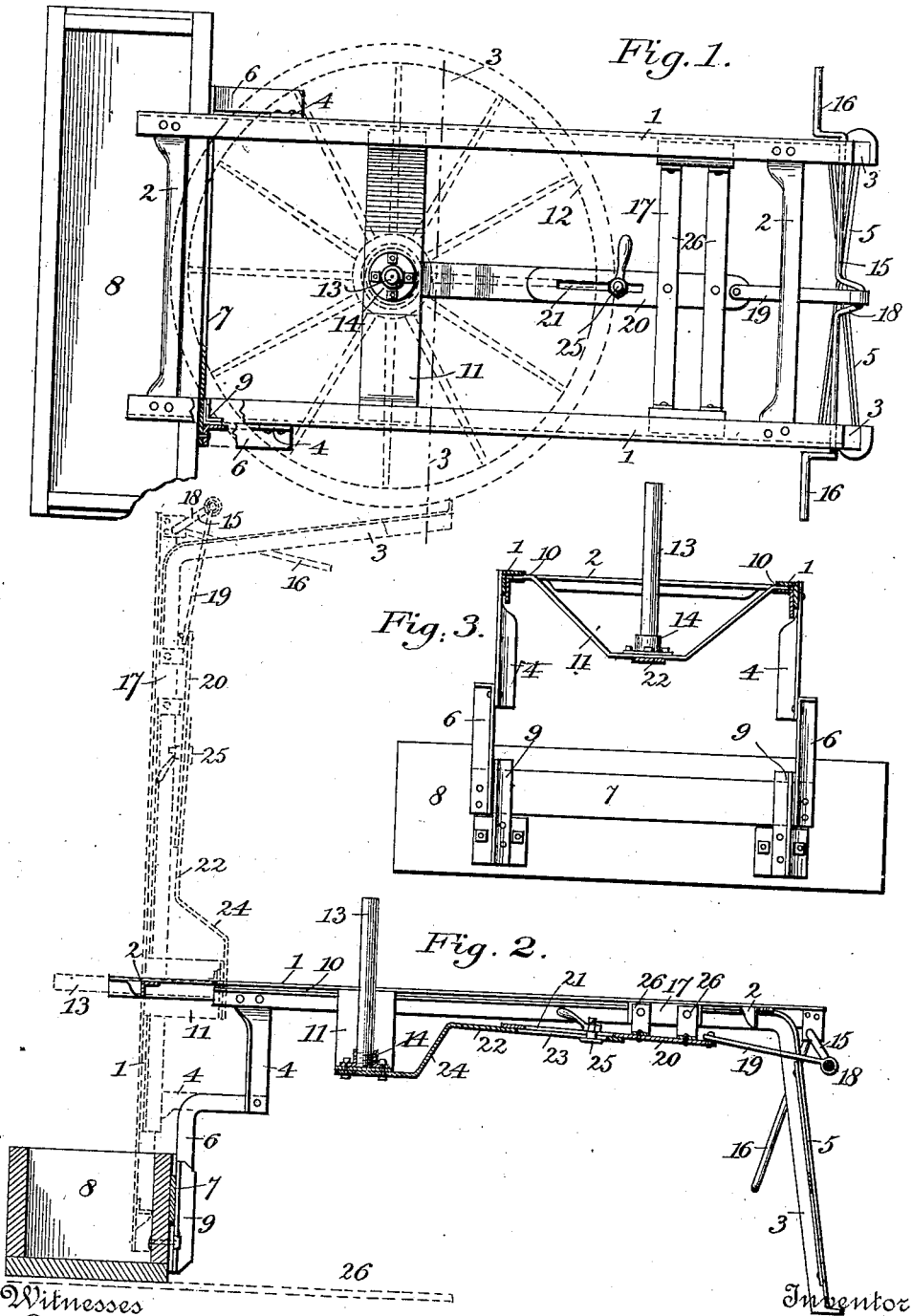

DANIEL BALLENGER, OF CARTHAGE, MISSOURI, ASSIGNOR OF FIFTY-ONE ONE-HUNDREDTHS TO BENJAMIN BALLENGER, OF LAMAR, MISSOURI, AND FORTY-NINE ONE-HUNDREDTHS TO JAMES N. BURNS, WALTER S. MORROW, AND WILLIAM P. BURNS, OF GOLDEN CITY, MISSOURI.

TIRE-SETTER.

No. 890,752.     Specification of Letters Patent.     Patented June 16, 1908.

Application filed May 2, 1907, Serial No. 371,461. Renewed May 11, 1908. Serial No. 432,278.

*To all whom it may concern:*

Be it known that I, DANIEL BALLENGER, a citizen of the United States, residing at Carthage, in the county of Jasper and State of Missouri, have invented certain new and useful Improvements in Tire-Setters; and I do declare the following to be a full, clear, and exact description of the invention, such as will enable others skilled in the art to which it appertains to make and use the same.

This invention relates to tire setters, and has for its object to provide a frame or support having a reciprocatory carrier upon which the wheel may be mounted when the heated tire is applied thereto, and which frame may then be turned into a vertical position, whereby the rim of the wheel may be immersed in water for the purpose of cooling the tire while the wheel is being rotated when held in this position.

The object of the invention is to provide a frame that will be strong, simple and convenient, and upon which the wheel may be adjustably mounted so as to be moved back and forth relatively to the length of the frame to permit of the wheel being moved so as to permit of its entrance into and removal from a trough to which one end of the frame is pivotally and removably connected.

In the accompanying drawings, which illustrate the invention, Figure 1 is a broken top plan view of a structure embodying the invention, a wheel being shown thereon in dotted lines; Fig. 2 is a central, longitudinal sectional view of the same, showing the device in two positions; and Fig. 3 is a transverse sectional view of the frame on the line 3—3 of Fig. 1.

Referring more particularly to the drawings, 1—1 indicate two parallel side pieces which are rigidly secured at the desired distance apart by means of cross pieces, 2—2. The side pieces are supported at the desired height by means of sets of legs, 3 and 4, the legs 3 at one end being strengthened by cross pieces 5, and the legs 4 at the other end being jointed and having their lower ends bent into substantially L-shaped portions, 6, which are connected at their lower or free ends by means of a cross bar or plate 7. The sections 6 are adapted to be removably secured to or connected with the side of a trough 8, as by means of guide ways, 9, adapted to engage with the side pieces 6 and having their upper ends at a sufficient distance from the side of the trough to permit of the insertion of the cross plate 7.

The side pieces are provided with guide ways, 10, upon their inner or adjacent faces within which is reciprocally mounted a wheel carrier or support. This carrier is preferably formed from a cross piece 11, which is bent downwardly at its center for the reception of the hub of the wheel 12, shown only in dotted lines in Fig. 1, and a standard, 13, projects upwardly from the bottom of the bend for the purpose of passing through the hub of the wheel and forming an axle upon which the wheel may be rotated. If desired, the standard may be screw threaded into a screw-threaded washer 14 on the cross piece 11 so as to be removable. A crank shaft 15 is journaled across the forward end of the frame and is preferably provided at each end with a handle or crank, 16, by means of which the shaft may be oscillated.

A frame 17 is mounted in the guide ways 10 and is connected with the crank 18 of the shaft 15 by means of a pitman, 19.

A bar 20 is rigidly secured to the frame 17 and has one end slotted longitudinally as shown at 21. This end of the bar 20 is adapted to overlap one end of a bar 22, which is also slotted longitudinally as shown at 23, and has its other end bent downwardly as shown at 24, and rigidly secured to the cross piece 11. A clamping bolt 25 extends through the slots 21 and 23 and thereby binds the ends of the bars 20 and 22 in any desired position.

The side piece 1 may be formed in any desired manner, and also the guide ways 10, but I prefer to form them out of angle iron with two of the webs or sides of said irons rigidly secured together, and the other two sides at a sufficient distance apart to form the guide ways 10 for the reception of the ends of the cross piece 11 also the ends of the frame 17 or the cross pieces 26 by means of which the side pieces of the frame 17 are secured together may be of angle-iron. In this construction, the forward ends of the lower or inner angle iron can be extended and bent downward so as to form the legs 3. The portion of the bolt 25 adjacent to the head is also preferably made angular so as to fit into the slot 23 and thereby prevent the rotation of the bolt when the nut is turned for clamping the bars 20 and 22.

In using the tire setting device as above described, the leg sections 6 are connected with the trough 8 and the trough filled with water. The wheel is then placed upon the standard 13 ready to have the heated tire placed thereon. The tire is then placed in position upon the wheel and secured in the ordinary manner, after which the entire frame is raised into a vertical position, which will cause the rim of the wheel to project down into the water in the trough, when, by slightly rotating the wheel, and pouring water upon the tire in the ordinary manner, the tire soon cools and is thereby drawn tightly upon the rim of the wheel, after which the frame is lowered into its horizontal position and the wheel is removed. The position of the wheel relative to the frame is controlled by properly adjusting the bars 22 and 24; and its movement back and forth relative to the length of the frame while it is in the tub, by means of the crank shaft, 15.

If desired, a cross piece 27, shown only in dotted lines, can be secured to the bottom of the trough to prevent its being upset when the frame and wheel are being raised into or lowered from the vertical position, although the weight of the water in the trough will be sufficient to hold the trough in an operative position by exercising due care in raising and lowering the frame. After the tire has been set in the above manner, the frame may be removed from the trough and the trough can be used for the ordinary slack tub or for any other desired purpose.

Having described my invention, I claim:

1. A device as described, comprising longitudinal parallel side members provided with guide-ways, said parallel members each having a fixed leg at one end and each supported at its opposite end by means of a sectional leg, one member of which is fixed to and depends from its respective side member, and the other leg member being of inverted L-shape, with its upper horizontal arm pivoted to said pendent fixed leg-section, to permit said pendent leg-sections to be swung into parallelism with the horizontal arms of said L-shaped leg-sections, thereby causing said side members to assume a parallel position relative to the vertical arms of said L-shaped leg-sections, when said frame is swung into a vertical position for immersing the wheel, and means carried by said guide-ways for supporting the wheel in position upon said side members.

2. A wheel-tire setting device comprising parallel side members provided with guide-ways, a slidable wheel support arranged to move in said guide-ways, means for actuating said slidable wheel support, said side members each having at one end a fixed leg to rest upon the floor or ground and each supported at its opposite end by means of a sectional leg, one leg section or member being fixed to, and depending from its respective side member, and the other leg section or member being of inverted L-shape, with its upper horizontal arm or portion standing at a right-angle, and pivoted to the said pendent leg-section, and an immersing receptacle or trough provided with guide-ways spaced therefrom, to receive the vertical arms of said L-shaped leg-sections.

In testimony whereof I have hereunto set my hand in presence of two subscribing witnesses.

DANIEL BALLENGER.

Witnesses:
M. I. HUBB,
J. M. INNES.